United States Patent [19]
Cselle

[11] Patent Number: 5,890,849
[45] Date of Patent: Apr. 6, 1999

[54] TOOL-HOLDING FIXTURE FOR TOOLS SUPPLIED WITH COOLANT OR LUBRICANT AND ASSOCIATED RESERVOIR FOR COOLANT OR LUBRICANT

[75] Inventor: Tibor Cselle, Sigmaringen, Germany

[73] Assignee: Gottlieb Guehring KG, Albstadt, Germany

[21] Appl. No.: 973,717

[22] PCT Filed: Jun. 28, 1996

[86] PCT No.: PCT/EP96/02838

§ 371 Date: Mar. 18, 1998

§ 102(e) Date: Mar. 18, 1998

[87] PCT Pub. No.: WO97/02109

PCT Pub. Date: Jan. 23, 1997

[30] Foreign Application Priority Data

Jun. 30, 1995 [DE] Germany .......................... 195 24 004.9
May 8, 1996 [DE] Germany .......................... 196 18 540.8

[51] Int. Cl.⁶ .................................................. B23B 35/00
[52] U.S. Cl. .............................. 408/1 R; 279/20; 408/56; 408/57; 409/136
[58] Field of Search ................................ 408/1 R, 57, 56, 408/59; 409/136; 279/20

[56] References Cited

U.S. PATENT DOCUMENTS 1,421,713   7/1922   Petrasek .
4,517,768   5/1985   Hausermann et al. .
4,555,047  11/1985   Ackley .
4,642,005   2/1987   Kondo et al. .............................. 408/56
5,419,661   5/1995   Meachum ................................... 408/57
5,800,104   9/1998   Miyano ..................................... 409/136

FOREIGN PATENT DOCUMENTS

0 030 911   12/1979   European Pat. Off. .
   29794    5/1884    Germany .
  909 877   4/1954    Germany .
1 627 186  10/1967    Germany .
82 03 362   2/1983    Germany .
  248 537   8/1987    Germany .
  260 459   9/1988    Germany .
54-116797   9/1979    Japan .
  1421494   3/1987    Russian Federation .
  1316757  11/1987    Russian Federation .

*Primary Examiner*—Daniel W. Howell
*Assistant Examiner*—Monica Smith
*Attorney, Agent, or Firm*—Oblon, Spivak, McClelland, Maier & Neustadt, P.C.

[57] ABSTRACT

The invention therefore provides a tool holder for tools supplied with coolant or lubricant, especially rotating tools such as boring or milling tools, with an internal duct system for passing coolant or lubricant to the shank of the tool. To enable particularly flexible use of machine tools, the tool holder is equipped according to the invention with a lubricant reservoir which is integrated into the tool holder and which is preferably fillable and pressurizable, which during operation of the tool can be decoupled from a coolant or lubricant source and supplies the tool controllably with coolant and lubricant via a metering unit.

26 Claims, 4 Drawing Sheets

TOOL-HOLDING FIXTURE FOR TOOLS SUPPLIED WITH COOLANT OR LUBRICANT AND ASSOCIATED RESERVOIR FOR COOLANT OR LUBRICANT

The invention relates to a tool holder for tools supplied with coolant or lubricant according to the preamble of claim 1 and to a cooling or lubricating process according to process claim 22. The invention relates in particular to a tool holder for rotating chip-removing tools such as boring, milling, reaming or thread-cutting tools. It must already be mentioned at this place, however, that the invention is not limited to this field of use. The field of use relates to the entire technique of chip removal in which the tool lips are subject to particularly severe thermal and/or mechanical load.

The heat generated at the lip during chip removal is in many cases removed by selective supply of coolant or lubricant. Whereas separate lubricant lines routed along the body of the machine tool and having exit nozzles directed at the lip have been used in the past, an increasing practice in recent years has been to pass the coolant or lubricant through internal ducts in the tool directly to the tool lip. Not only does this permit savings in coolants or lubricants, but also it yields the further benefit that coolants or lubricants can be supplied at much higher pressures to points subject to particularly severe thermal loads.

In order to further reduce the coolant or lubricant flow in view of the progressively more strict environmental protection requirements, the development of modern tools is aimed at using the coolant or lubricant even more selectively, for example by placing the outlet opening of coolant or lubricant ducts contained in the tool in the immediate vicinity of the lip. Furthermore, attempts are being made to use, in the region of the lip or lip carrier, new materials which can get by with substantially lower coolant or lubricant flows. In this connection, dry or pseudo-dry machining tools have been designed that can be used even in machine tools that do not have a separate lubricant or coolant supply.

Dry and pseudo-dry machining is now progressively gaining acceptance in production engineering. However, this form of machining cannot be achieved for all tools and especially not for all cutting conditions, i.e., feed rates, speeds, etc. Since machine tools are routinely equipped with a plurality of the most diverse tools, however, flexibility is also required with respect to the coolant and lubricant supply of the tool.

The object of the invention is therefore to provide a tool holder according to the preamble of claim 1 which makes it possible to use a broad spectrum of tools having diverse coolant or lubricant needs even in machine tools designed for pure dry machining.

This object is achieved by the tool holder according to claim 1.

According to the invention, a tool holder that can be handled as a tool-system module is created that is autonomous with respect to the coolant or lubricant supply for the tool to be chucked or held. In other words, the tool holder according to the invention is used as replacement for the relatively complex line systems heretofore necessary for the supply of coolant or lubricant in known machines. As a result, tools that must be operated with or without coolant supply, depending on service conditions such as cutting speed or feed rate, can be used on machine tools without coolant or lubricant supply in order to achieve optimum chip-removal performance. The tool holder according to the invention therefore considerably increases the flexibility of production by chip removal, and can be very easily integrated into existing tool systems. Because the coolant or lubricant reservoir is fillable, the overall space needed by the tool holder can be reduced, thus opening the possibility of operating the tool holder even with extremely high speeds of up to 30,000 rpm, for example. The metering unit according to the invention permits very economic use of coolant or lubricant, thus benefiting environmental protection. According to the invention, therefore, it is possible, for example, to pilot the metering unit such that lubricant or coolant reaches the most severely loaded lip zones only in selectively metered quantities, whenever absolutely necessary to protect the lip or achieve the desired surface texture.

An advantageous further embodiment with respect to design and function of the tool holder is obtained with claim 2. In this case, the metering unit is integrated into the tool holder, in addition to the coolant or lubricant reservoir already integrated into the tool holder.

According to dependent claim 3, the metering unit is provided with a delivery unit, thus opening the possibility of using the coolant or lubricant even more selectively and more exactly, in order to get by with minimum coolant or lubricant flows (minimum-flow lubrication).

The coolant or lubricant delivery unit according to claim 4 has the special advantage that the coolant or lubricant can be metered in speed-dependent and finely adjusted manner with little complexity, thus ensuring good environmental compatibility.

This delivery unit sucks in air from the atmosphere, with the resulting advantage that a further energy or pressure source is not necessary. It has been found, according to dependent claim 5, that the aforesaid advantage can be achieved by constructing the delivery unit in the form of a pump, preferably a vane pump.

According to dependent claim 6, the air stream sucked in via the delivery unit is passed through a mixing chamber attached to the duct system, whereby coolant or lubricant is entrained and can be supplied as a mixture of air with coolant or lubricant to the tool lip. This mixture of air with coolant or lubricant helps to get by with minimum coolant or lubricant flows, and simultaneously to achieve a substantially better lubricating effect for the tool than is the case with pure Medium [sic:medium] lubrication.

Dependent claim 7 presents the structure of such a mixing chamber, which connects the coolant or lubricant reservoir via a duct system in the tool holder and a metering valve, disposed in the duct system, for the coolant or lubricant supply to the chucking point of the tool.

The coolant or lubricant reservoir can in principle have any desired shape. In the embodiment according to claim 8, however, the cylindrical shape of the reservoir volume creates the prerequisite for rotationally symmetric geometry, which is preferred from the viewpoint of simple balancing. Thus the tool holder is particularly suitable for rotationally driven tools.

The embodiment in claim 9 has the advantage that the springs providing stored energy can be mounted in very space-saving manner. Thereby the storage spring can be designed with a relatively flat spring characteristic, with the result that the reservoir pressure can be maintained at a constant level regardless of the filling volume.

A further structural improvement can be achieved with the embodiment of claim 10. Advantageously, the metering unit is formed by a metering-valve unit. Numerous options are available for the geometry of the metering-valve unit. Metering valves can be mounted with the desired characteristic in the narrowest space where, for example, adjustable restoring springs are used for the corresponding valve gates or other adjustment means are used for adjustable throttles. It is also possible to use hydraulic structural elements with which the pressure drop across the throttle can be controlled as a function of viscosity or temperature.

It has been shown that a metering unit can be piloted with simple actions, which depend on service conditions of the tool or on cutting conditions at the lip. For rotating tools, this is achieved advantageously by the fact that the control force for the metering-valve unit is determined by centrifugal force. In this case, the opening characteristic of the throttle is matched to the nonlinear change of the control force in such a way that adequate supply of lubricant or coolant to the lip is ensured. In this connection, it is additionally advantageous to equip the metering-valve unit with a kind of flow-control function in such a way that the coolant or lubricant flowing through the metering-valve unit can actually be delivered to the lip in the quantity optimally adapted to the service case for which the tool is being used at the time.

Further advantageous embodiments of the invention are the subject matter of the other dependent claims.

Finally, in view of future constantly changing requirements in the area of environmental compatibility, the object of the invention is to provide a particularly ecological and economical process for cooling or lubricating tools. The achievement of this object is the content of process claims 22 to 26.

The invention will be explained in more detail hereinbelow by reference to several practical examples shown in schematic drawings, wherein.

Figure 1:
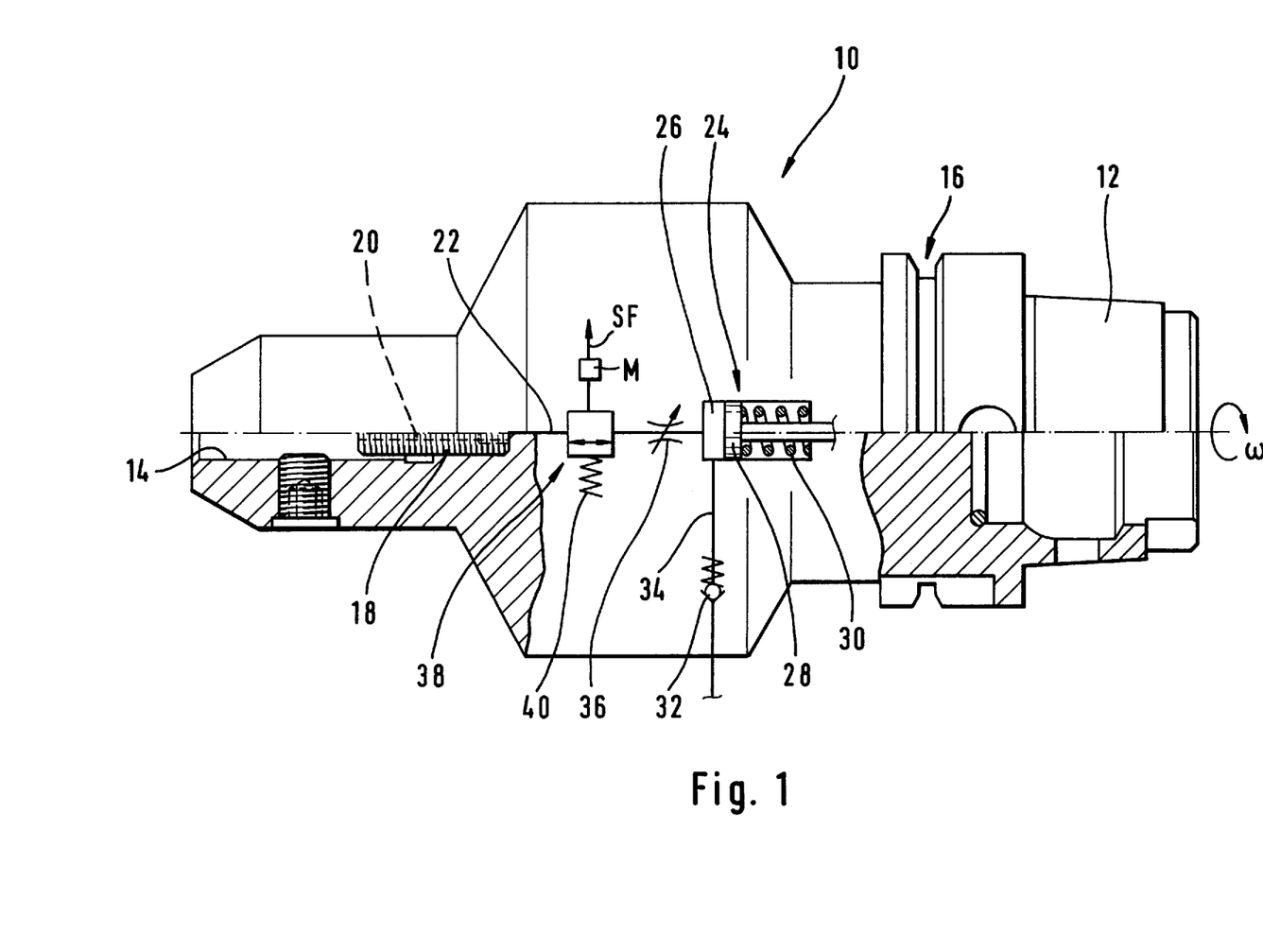
FIG. 1 shows a schematic, partly sectional and cutaway side view of a first embodiment of a tool holder constructed as a tool-system module.

In FIG. 1, reference number 10 denotes a tool holder formed as a tool-system module, which is provided at one end (the right side in FIG. 1) with a hollow-shank taper 12 for coupling to a corresponding holder of a further tool-system module or a machine spindle, and at the other end (the left side in FIG. 1) with a cylindrical holder 14 for holding a tool, which is not further shown. The number 16 denotes a gripper groove, so that the module shown in FIG. 1 is suitable for both manual and automatic tool changing.

The special feature of the modular tool holder shown in FIG. 1 is that it forms an autonomous unit for metered lubricant or coolant supply to the tool inserted in holder 14. For this purpose the cylindrical holder 14 contains a coolant or lubricant insert 18, which has a central hole 20 for the lubricant or coolant to be fed to the tool. The central hole 20 is in fluid communication with a schematically indicated coolant or lubricant line 22 in holder 10.

A schematically illustrated coolant or lubricant reservoir 24 formed by a piston-and-cylinder arrangement is integrated in the tool holder, such that, at the end facing the coolant or lubricant line, a volume filled with coolant or lubricant is defined by the housing of the reservoir 24 together with the piston 28. The volume 26 is preferably filled with an ecologically safe lubricating fluid such as "biofluid".

Reference number 30 denotes a spring that preloads the piston 28 in order to maintain the volume 26 under a predetermined pressure.

The volume 26 can be filled with coolant or lubricant via a supply line 34 and, in fact, via a nonreturn valve 32, which prevents the pressure in volume 26 from escaping to the outside.

The volume 26 is also connected to the coolant or lubricant line 22 and, in fact, via an adjustable throttle or a throttle valve 36 and a variable-passage orifice 38 connected in series therewith. This is indicated by the valve symbol in FIG. 1, the valve gate being represented by a square and the two-headed arrow designating the passage through the orifice. The valve gate is preloaded in such a way by a preloading force—represented by the spring 40—that the orifice, or in other words the passage of coolant or lubricant to line 22, is blocked. In the opening direction, or in other words in the direction opposing the force of spring 40, there acts a positioning force SF, which according to the invention varies with the operating condition of the tool, i.e., with the associated, varying coolant or lubricant demand of the lip. In the illustrated practical example, the positioning force is controlled by centrifugal force, to the effect that there acts on the valve gate a mass M, the centrifugal force of which varies with the rotational velocity $\Omega$ of the tool and thus of the tool holder and adjusts the orifice 38.

The foregoing description shows that the tool holder is decoupled from an external coolant or lubricant source during operation of the tool, but nevertheless the tool inserted in holder 14 receives an adequate coolant or lubricant flow while the tool is in operation. By appropriate adjustment of the reservoir pressure, for example by the preload of spring 30, of variable throttle 40 and of the opening characteristic of orifice 38, the lubricant supply to the lip can be adjusted to the respective machining task with a view to minimum consumption of coolant or lubricant. In the process, the lubricant is preferably passed from the chucking point downstream from line 22 via internal coolant ducts to the tool lip.

Figure 2:
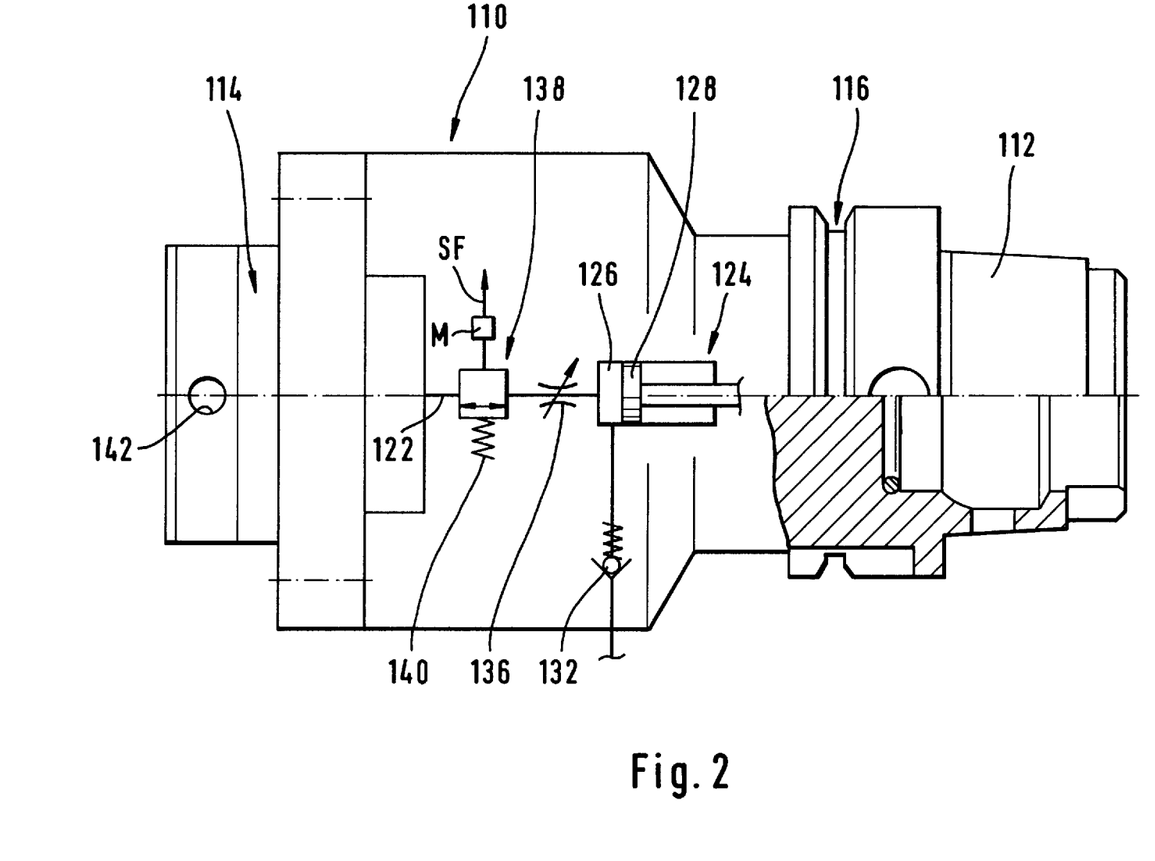
FIG. 2 shows a view, similar to that of FIG. 1, of a further embodiment of the tool holder.

The configuration of the tool holder according to the invention is not limited to a particular chucking system of the tool-system module and/or of the tool. This will be explained in more detail by reference to FIG. 2:

The embodiment according to FIG. 2 corresponds largely to that according to FIG. 1. Corresponding or comparable components are therefore denoted with similar reference numbers, except prefixed with a "1". The only differences from the geometry according to FIG. 1 are shown in the region of the tool holder at the left end of the module according to FIG. 2. In this case the tool holder 114 is formed by a schematically illustrated holding flange in which, for example, a hollow-shank taper tool can be held. Reference number 142 denotes a radial passage opening, which can be aligned with a corresponding passage opening in the hollow chucking taper of the tool, which is not further illustrated, so that appropriate positioning elements of the associated chucking system can be actuated for clamping the tool in holder 110.

With the embodiment according to FIG. 2—in the form of an intermediate module—only a single module provided with a coolant or lubricant reservoir is needed to which tool holders of any desired shape can be coupled.

Otherwise the geometry according to FIG. 2 corresponds completely to that of the embodiment according to FIG. 1, especially with respect to the coolant or lubricant reservoir and its supply or metered discharge, and so a more detailed description is functionally not necessary here. In contrast to the embodiment according to FIG. 1, the spring 30 is not shown, which is intended to illustrate that the preload of the reservoir volume 126 can also be applied in other suitable ways.

Figure 3:
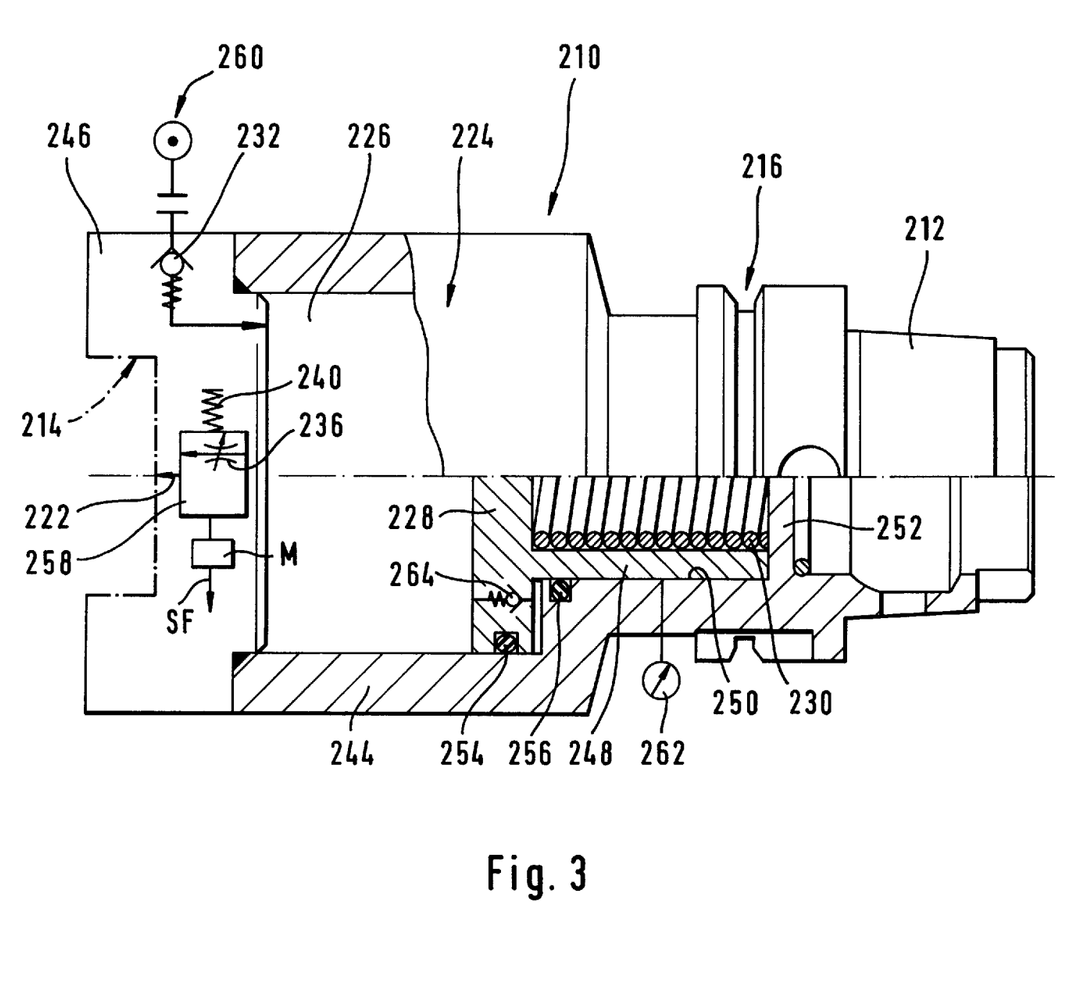
FIG. 3 shows a view, similar to that of FIG. 2 (partly in section), of a third embodiment of the tool holder in the form of a tool-system module, in order to explain a practical example of the coolant or lubricant reservoir.

Referring now to FIG. 3, a detailed description will be given of a further possible embodiment of the tool holder according to the invention, which at the left end according to FIG. 3 is equipped with a highly schematized tool holder. To simplify the description, those parts and components similar or corresponding to the elements of the embodiment described hereinabove are again denoted in FIG. 3 with similar reference numbers, prefixed with "2".

It will be recognized that the holder 214 for the tool, which is not shown, is highly schematized, and this is further emphasized by the dot-dash lines.

At the right end according to FIG. 3, a hollow-shank taper 212 for coupling to the adjacent tool-system module or to the machine spindle is once again disposed on the tool-holder module.

FIG. 3 shows details of the embodiment of the coolant or lubricant reservoir 224 integrated into the tool holder. The rotationally symmetric housing of the tool holder 210 is widened radially outward between the connection points at both ends, thus forming in the interior a cylindrical reservoir volume 226 with a capacity of about 100 to 300 cm$^3$, for example. The housing 244 of circular cylindrical shape is closed at the end 214 of the tool holder by a circular plate 246. At the end facing the circular plate 246, the inside volume 226 is bounded by the piston 228, which forms at the end facing away from the tool a guide collar 248, for which a guide recess 250 is provided in tool holder 210.

In the guide collar 248 there is seated the storage spring 230, which is braced against a wall 252 forming the bottom of the hollow-shank taper 212. Reference numbers 254 and 256 denote packings.

It will be recognized from the diagram that the tool holder according to FIG. 3 has rotationally symmetric structure, whereby good prerequisites are created for highly accurate balancing of the tool holder or module. By the fact that the storage spring 230 is seated largely in the interior of the guide collar 248 of piston 228, little overall space is sacrificed, even though storage spring 230 is very long and can therefore be designed with a very flat spring characteristic. Thereby the advantage is obtained that the storage spring 230 can maintain an approximately constant internal pressure of 3 to 5 bar, for example, during the entire travel of piston 228, i.e., with increasing discharge of reservoir volume 226.

Reference number 258 denotes a somewhat modified metering-valve unit, in which the adjustable throttle is integrated in the throttle valve. Otherwise, as in the foregoing, there are provided a restoring spring 240 as well as a positioning force, induced by mass M as a function of centrifugal force and opposing the force of this restoring spring 240. As can also be inferred from FIG. 3, the metering-valve unit 240 is integrated into the circular plate 246 closing the housing 244, as is the charging nonreturn valve 232, which can be attached to an external source 260 of pressurized fluid in order to fill the reservoir.

Finally, reference number 262 denotes a fluid-level indicator by means of which—for example indirectly—the instantaneous fluid level of the reservoir volume 226 can be read via the position of piston collar 248. Reference number 264 denotes a further nonreturn valve, which ensures, during the process of filling of reservoir volume 226, that excess pressure does not build up on the back side of piston 228.

Figure 4:
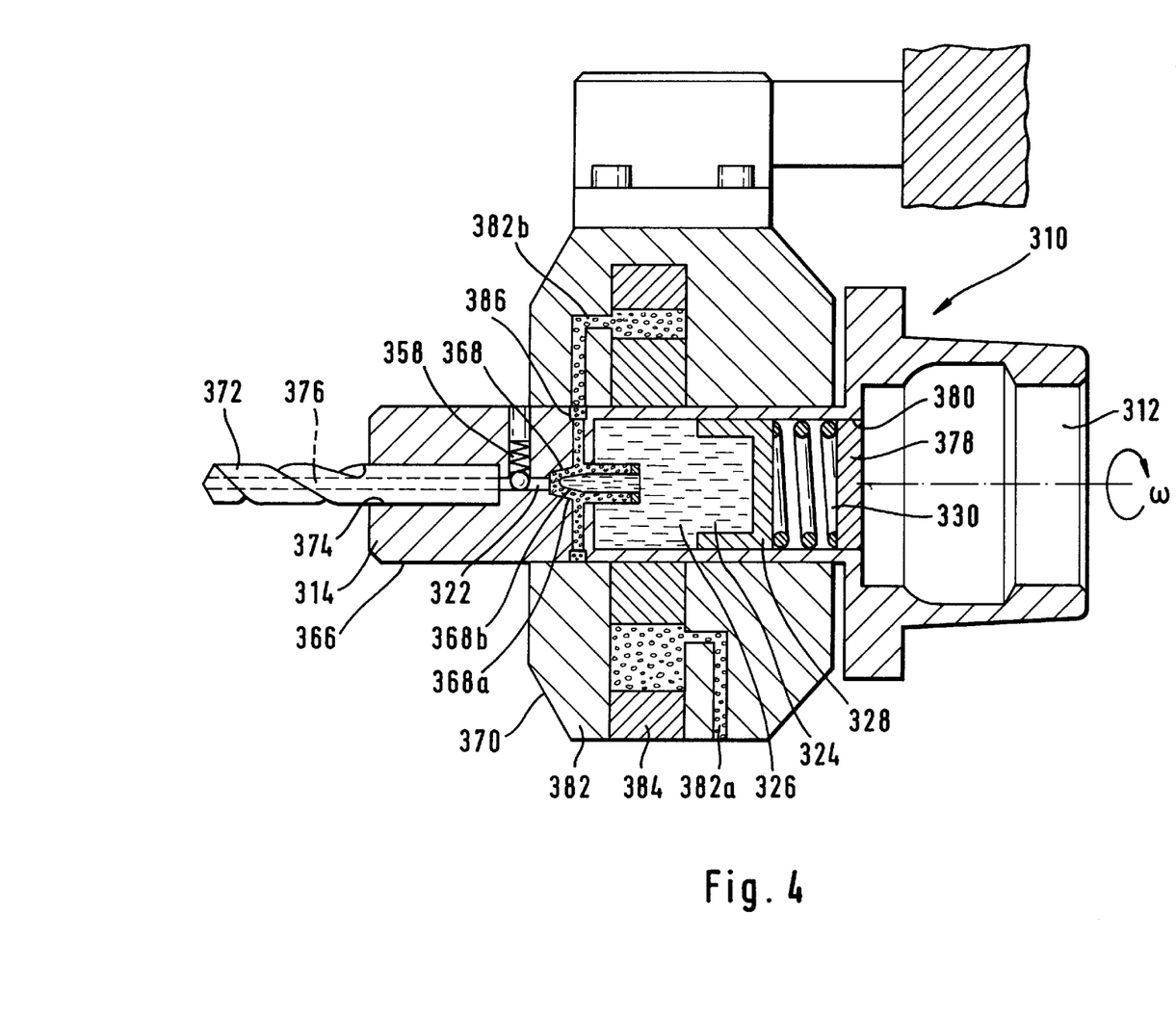
FIG. 4 shows a cross section of a further embodiment of the invention with a delivery unit for coolant or lubricants that works independently of an external energy source.

FIG. 4 shows a tool holder which differs somewhat in structure and functioning from the tool holders illustrated in the foregoing. The concept of cooling and lubrication of a tool by coolant or lubricant from a reservoir integrated in the tool holder is still the same, but this embodiment according to the invention represents a further improvement with respect to minimum lubrication. Corresponding or comparable components are again denoted by similar reference numbers, prefixed by a "3" in FIG. 4. More detailed description of the mode of operation or of the structure of the components known from the foregoing embodiments is not needed here.

The tool holder denoted by reference number 310 is provided with a tool-holding shank 366, a metering unit 358, 368 and 370 and, at the right end according to FIG. 4, a hollow-shank taper 312. The metering unit again comprises a metering valve 358, a mixing chamber 368 and a delivery system or delivery unit 370.

As in the foregoing embodiments, the tool holder 310 is constructed as a tool-system module and thus can be coupled to a further tool-system module, for example to a boring and milling spindle.

Similarly to the foregoing embodiments, the right region of the tool-holder shank 366 is constructed as a hollow-shank taper 312 for coupling to a further tool-system module. The left region is constructed as a cylindrical holding section 314 for holding a tool 372, especially a chip-removing tool such as a boring bit. This holding section 314 is provided with a holding bore 374, into which the tool 372 is inserted and fixed or chucked in a manner not further described here, for example by a binding screw. Reference number 376 denotes an internal lubricating duct or an internal duct system in the tool 372, which discharges in the vicinity of the lip. The coolant or lubricant is passed to the tool tip, i.e., to the region of the tool lip, via the duct system 322 formed in the cylindrical holder 314 and the duct system 376 formed in the tool.

The region of the tool-holder shank 366 between the cylindrical holder 314 and the hollow-shank taper 312 is formed as a hollow shaft or a hollow shank. The rotationally symmetric inside space of the hollow shank is used as the coolant or lubricant reservoir 324, which at the right end facing away from the tool 372 is closed fluid-tightly with a sealing piece 378 functioning as the bottom of the hollow-shank taper 312. This sealing piece 378, constructed as a circular plate, is suitably interlocked with the inside circumferential wall 380 of the hollow shank, for example by means of a threaded screw coupling, that the coolant or lubricant is leaktightly enclosed and no hindrance is caused for the tool-system module coupled to the hollow-shank taper 312, as can be seen in FIG. 4.

The volume 326 of the coolant or lubricant reservoir 324 is bounded both by the inside walls of the hollow shank and by a spring-loaded piston 328. The coolant or lubricant reservoir 324 can be filled via the aforesaid sealing piece 378, for example by means of a filling valve disposed in this sealing piece 378 or by unscrewing the sealing piece 378 and then screwing it back on after addition of lubricant.

The piston 328 bounding the reservoir 324 is braced by a spring 330 against this sealing piece 378. The spring-loaded piston 328 exerts pressure in the direction of tool 372 on the coolant or lubricant contained in the coolant or lubricant reservoir 324. The task of the spring-and-piston structure 238 [sic: 328] and 330 is to pressurize the coolant or lubricant in the coolant or lubricant volume 326 of reservoir 324 even during dispensing of coolant or lubricant. This prevents a condition in which the sucked-in air flows into the coolant or lubricant reservoir during rotation of the tool holder, as would be the case, for example, of a constant-volume reservoir. The spring constant of spring 330 is preferably chosen such that the coolant or lubricant volume is indeed pressurized, but not forced into a mixing chamber 368 to be described hereinafter.

During rotation of the tool holder, the coolant or lubricant is passed via a mixing chamber 368 in communication with the coolant or lubricant reservoir 324 and a metering valve 358 installed in a supply duct 322 to the chucking point of the tool 372 and thus to the tool 372.

The mixing chamber 368 is attached in the cylindrical holder 314 in such a way that it is positioned at the height of the axis of rotation of the tool holder 310 and extends partly into the cylindrical holder 314 of the tool-holder shank 366, and also partly into the coolant or lubricant reservoir 324. Thus, via the mixing chamber 368, the coolant or lubricant reservoir is in communication with the supply duct 322 of the cylindrical holder 314.

When metering valve 358 is open, the direction of flow of the coolant or lubricant therefore runs from right to left toward the tool, i.e., from the coolant or lubricant reservoir 324, through the mixing chamber 368, into the supply duct 322 and via the metering valve 358 to the chucking point of the tool. The metering valve 358 is constructed, for example, as a throttle valve, as was already the case in the foregoing embodiments. Further description is therefore not needed. The mixing chamber 368 will be described in more detail hereinbelow.

Reference number 370 denotes a delivery unit comprising substantially two parts: a pump case 382 and a pump impeller 384.

Relative to tool holder 310, the pump case 382 can be coupled appropriately with a headstock, which is not further described, in such a way that it rotates therewith, and relative to tool-holder shank 366 it is held rotatably. The pump impeller 384 is mounted rotatably in pump case 382 and is firmly joined to tool-holder shank 366 so as to rotate therewith.

In pump case 382 there are formed ducts 382a and 382b, via which air is sucked in from the atmosphere around tool holder 310 and passed on during rotation of tool holder 310. Reference number 382a denotes an intake duct which is in communication with the outside atmosphere around the tool holder 310 and via which air is sucked in from the atmosphere. Reference number 382b is a pressure duct via which the air sucked in during rotation is passed to an annular slot 386 formed in the tool-holder shank. The annular slot 386 is in communication with mixing chamber 368 via one or more holes, whereby the air stream is introduced radially into the mixing chamber in this practical example.

The pump impeller 384 can be constructed as a vane-cell impeller of a vane pump. Pump impeller 384 and pump case 382 together constitute the delivery unit, in the form of a vane pump, for example, which sucks in air from the atmosphere during rotation of the tool holder, compresses it to about 2 bar and supplies it to the mixing chamber. The function and specific structure of a vane pump can be found in the technical literature.

The mixing chamber 368 is constructed as a double-ring nozzle having an inner ring 368b and an outer ring 368a, and its flow is directed toward the tool. By means of the delivery unit 370, the air sucked in from the atmosphere and compressed is passed radially into the outer ring 368a. When the metering valve 358 opens the supply duct 322 between the mixing chamber 368 and the tool 372 during rotation, the pressurized air flows to the chucking point of the tool, and in the process the coolant or lubricant is passed via the inner ring 368b into the space between the inner ring 368b and the outer ring 368a of mixing chamber 368 and entrained by the air stream. During this process, therefore, a mixture comprising air and coolant or lubricant is formed and supplied to the tool at a rate corresponding to the rotation of the tool holder. It must be noted in this connection that the metering of the mixture takes place on the one hand via the delivery unit 370 activated by rotation and on the other hand via the metering-valve unit 358. In this way a mixture comprising coolant or lubricant and air is supplied in metered manner to the tool as a function of the speed of rotation of tool holder 310.

As already mentioned hereinabove, the metering valve 358 can be constructed similarly to those described in the foregoing practical examples, and therefore will not be further described. In this embodiment, however, the metering valve may even be omitted, since metering of the coolant or lubricant dispensed to the tool already takes place via the delivery unit.

During operation of the tool holder 310 coupled with a further tool-system module, therefore, air is sucked in from the atmosphere via the pump case 382 by the pump impeller 384 of delivery unit 370 as it rotates with the tool holder, and is passed via the intake duct 382a, the pump impeller 384 and the pressure duct 382b toward mixing chamber 368 and introduced radially into this mixing chamber. During this process, the sucked-in air is compressed to a pressure of about 2 bar. This pressure is sufficient to pull or entrain the coolant or lubricant through perforations or openings formed in inside ring 368b into the space between the inside ring 368b and outside ring 368a of the mixing chamber. At the same time, the centrifugal-force-actuated metering valve is opened during rotation of the tool holder in a manner corresponding to this rotation as already known from the foregoing embodiments. Thereby the mixture, which consists of the pressurized air and the coolant or lubricant entrained from reservoir 324 by the air stream, can be supplied in supply duct 322 via metering valve 358, which is opened as a function of the speed of rotation of tool holder 310, to the internal duct system 376 of tool 372. The quantitative proportion of coolant or lubricant entrained per hour of operation relative to the sucked-in air flow is about 10 ml/h of coolant or lubricant per 3 m$^3$/h of air.

The advantages of this version of the tool holder compared with the prior art are therefore:

the mixture of air and coolant or lubricant achieves a substantially better lubricating effect for the tool than does lubrication with pure coolant or lubricant.

since air is sucked in from the atmosphere, additional energy is not needed. The tool holder can therefore work autonomously without an expensive air system.

lubrication with minimum coolant or lubricant flow in the mixture is achieved, which is important in particular from the viewpoint of environmental compatibility.

more economic operation can also be achieved by this minimum lubrication.

in addition, better distribution is achieved with such a mixture of air and coolant or lubricant than is the case with a pure lubricant.

The invention has been described in the foregoing by reference to a tool holder for rotating tools, such as boring, milling, countersinking or thread-cutting tools. It must be emphasized here, however, that the basic idea of the invention is to provide an autonomous coolant or lubricant reservoir, which can be coupled to any desired tool systems as needed and which, in cooperation with an appropriate metering unit, ensures that the tool autonomously, or in other words independently of external or machine-related coolant or lubricant supply systems, provides for an adequate and, in fact, optimally metered supply of lubricant to the tool lip. The physical geometry of the coolant or lubricant reservoir is then adapted to the spatial conditions in question, such as the shape of the tool or of the tool-chucking means. Furthermore, by the last-mentioned embodiment of the invention, there is achieved a tool holder that operates particularly effectively from the ecological and economic viewpoint.

It is obvious that modifications of the practical examples described in the foregoing are possible without deviating from the basic idea of the invention. For example, different metering-valve units may be used together with appropriate hydraulic components. In addition, the positioning force for the metering-valve unit can be derived from other variables, such as thermal measured variables. It is also possible to pilot the metering-valve unit externally, for example by infrared signals. Furthermore, the internal volume of the reservoir can also be supplied centrally via the machine spindle.

The invention therefore provides a tool holder for tools supplied with coolant or lubricant, especially for rotating tools such as boring or milling tools, with an internal duct system for supplying coolant or lubricant to the shank of the tool. In order to make it possible to set up machine tools particularly flexibly, the tool holder is equipped according to the invention with a coolant or lubricant reservoir which is integrated in the tool holder and preferably can be filled and pressurized, and which can be decoupled from a coolant or lubricant source during operation and provides the tool controllably with coolant and lubricant via a metering unit.

I claim:

1. A tool holder for rotating tools, comprising:
   an internal duct system configured to supply at least one of coolant and lubricant to a tool held by said tool holder; and
   a fillable and pressurizable reservoir configured to receive at least one of a coolant and lubricant, said reservoir integrated into the tool holder or constructed in one piece together with the tool holder;
   a metering unit configured to connect at least one of an external coolant or external lubricant source with said internal duct system;
   wherein the tool is configured to be decoupled from said at least one of external coolant and external lubricant source during operation of the tool, and wherein said metering unit is actuatable as a function of the rotation of the tool holder;
   wherein the metering unit is actuatable as a function of at least one of rotational speed and temperature during rotating operation of the tool.

2. A tool holder according to claim 1, wherein the metering unit is integrated into the tool holder.

3. A tool holder according to claim 1, wherein the metering unit further comprises a delivery unit.

4. A tool holder according to claim 2, wherein the delivery unit is configured for generating an air stream with which coolant or lubricant can be supplied in the form of a mixture of air and at least one of coolant and lubricant via the duct system to the tool lip.

5. A tool holder according to claim 4, wherein the delivery unit further comprises a pump, a pump case of which houses in its interior, a pump impeller which is rotatable relative to the pump case and is coupled with the tool holder in such a way that it can rotate therewith.

6. A tool holder according to claim 4, wherein the air stream passes through a mixing chamber, which is connected to the duct system.

7. A tool holder according to claim 6, wherein the mixing chamber houses a double-ring nozzle having an inner ring and an outer ring, and the air stream between the outer and inner rings entrains the coolant or lubricant via holes in the inner ring.

8. A tool holder according to claim 1, wherein said reservoir is formed by a cylindrical volume, which is bounded by a force-actuated, spring-loaded piston.

9. A tool holder according to claim 8, wherein the piston is provided at the end facing away from the tool with a guide collar, into which a storage spring extends.

10. A tool holder according to claim 1, wherein the metering unit is provided with at least one of a shutoff-valve unit and a metering-valve unit.

11. A tool holder according to claim 10, wherein the shutoff-valve unit or metering-valve unit is constructed such that at least one of its free passage cross section and its throttling characteristic is variable as a function of the operating condition of the tool.

12. A tool holder according to claim 11, wherein at least one of the shutoff-valve unit and the metering-valve unit is provided with an adjustable throttle.

13. A tool holder according to claim 10, wherein at least one of the shutoff-valve unit and the metering-valve unit has a valve gate, the position of which, relative to a flow-control edge, depends on the force of a restoring spring and an opposing positioning force, the magnitude of which varies with the machining condition of the tool.

14. A tool holder according to claim 13 for rotating tools, wherein the positioning force depends on centrifugal force.

15. A tool holder according to claim 13, wherein the positioning force depends on temperature.

16. A tool holder according to claim 10, wherein at least one of the shutoff-valve unit and the metering-valve unit is housed in a boundary wall of the cylindrical volume.

17. A tool holder according to claim 1, further comprising a rotationally symmetric structure.

18. A tool holder according to claim 1, wherein it is constructed as a module of a tool system and, at the end of said reservoir facing away from the chucking point, it is provided with a section for coupling to a further holder.

19. A tool holder according to claim 1, wherein at least one of the pressure of said reservoir is adjustable.

20. A tool holder according to claim 1, wherein said reservoir can be connected via a nonreturn valve to at least one of an external coolant and a lubricant pressure source.

21. A tool holder according to claim 10, wherein at least one of the shutoff-valve unit and the metering-valve unit is disposed between the chucking point of the tool and the mixing chamber.

22. A process for cooling or lubricating a rotating tool chucked in a tool holder, wherein at least one of a coolant and a lubricant housed in a reservoir integrated into the tool holder is supplied directly to the tool in its chucking position during rotating operation of the tool as a function of at least one of rotational speed and temperature via a duct system integrated into the tool holder and connecting the reservoir with the chucking point of the tool.

23. A process according to claim 22, wherein at least one of the coolant and the lubricant is supplied to the tool in a metered quantity, as a function of the rotation of the tool holder, via a metering unit which is actuatable as a function of at least one of rotational speed and temperature.

24. A process according to claim 22, further comprising the steps of:

air is sucked in from the atmosphere around the tool holder by means of a delivery unit, a mixture comprising the sucked-in air and the coolant or lubricant is formed in a mixing chamber, the mixture is supplied to the tool via the internal duct system and, if necessary, the mixture is additionally metered via the metering-valve unit installed in the duct system.

25. A process according to claim 24, in which mixture formation takes place in a mixing chamber integrated into the tool holder, wherein the air stream sucked in by the delivery unit is passed radially into the mixing chamber and this then carries the coolant or lubricant in axial direction toward the tool.

26. A process according to claim 24, wherein at least one of the coolant and the lubricant constitutes only a small fraction of the sucked-in air flow, the quantitative proportion of coolant or lubricant relative to air being reducible to a range of approximately 10 ml/h of oil to 3 $m^3$/h of air.

* * * * *